United States Patent [19]

Martelet

[11] 4,053,091
[45] Oct. 11, 1977

[54] COMBINATION REAR LUGGAGE CARRIER AND CHILD SEAT FOR BICYCLE

[75] Inventor: Ronald G. Martelet, River Forest, Ill.

[73] Assignee: Sears, Roebuck and Co., Chicago, Ill.

[21] Appl. No.: 690,889

[22] Filed: May 28, 1976

[51] Int. Cl.[2] .............................................. B62J 11/00
[52] U.S. Cl. ............................. 224/32 A; 224/30 R; 224/39; 280/202; 297/243
[58] Field of Search ............... 224/32 R, 32 A, 30 R, 224/31, 33 R, 39; 280/202, 289 A; 297/DIG. 9, 243; D6/48, 48.1

[56] References Cited

U.S. PATENT DOCUMENTS

| 1,212,221 | 6/1917 | Hobgood | 224/31 X |
|---|---|---|---|
| 3,623,747 | 11/1971 | Humlong | 280/202 |
| 3,802,598 | 4/1974 | Burger et al. | 280/202 |
| 3,902,737 | 9/1975 | Berger | 297/DIG. 9 X |
| 3,921,868 | 11/1975 | Reichbach | 224/39 X |

FOREIGN PATENT DOCUMENTS

| 243,499 | 12/1946 | France | 224/32 R |
|---|---|---|---|
| 415,447 | 6/1925 | Germany | 224/31 |
| 222,936 | 8/1942 | Switzerland | 224/30 R |

*Primary Examiner*—Robert J. Spar
*Assistant Examiner*—Winston H. Douglas
*Attorney, Agent, or Firm*—Arnstein, Gluck, Weitzenfeld & Minow

[57] ABSTRACT

A carrier formed of welded rod or tubular metal and mountable on a conventional bicycle above the rear wheel to provide a rigid platform for supporting items of luggage and the like. A child's seat of molded plastic material includes simple means for detachably securing the seat to the carrier so that the device may be selectively used for carrying a child or luggage.

1 Claim, 8 Drawing Figures

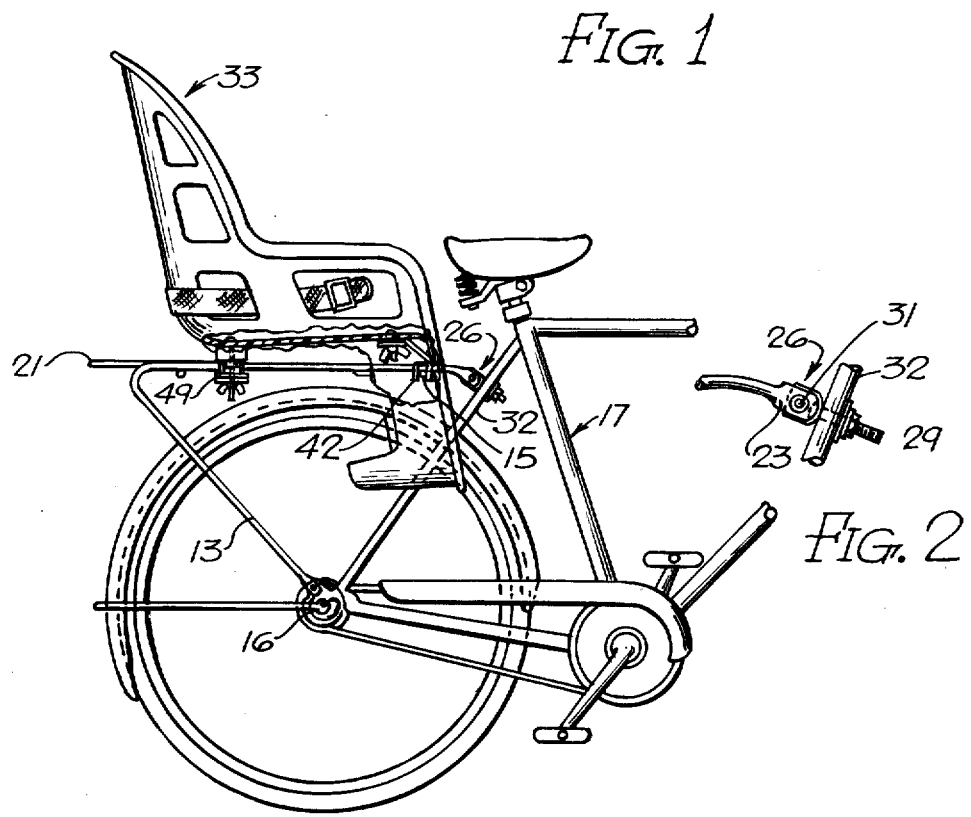
FIG. 1
FIG. 2
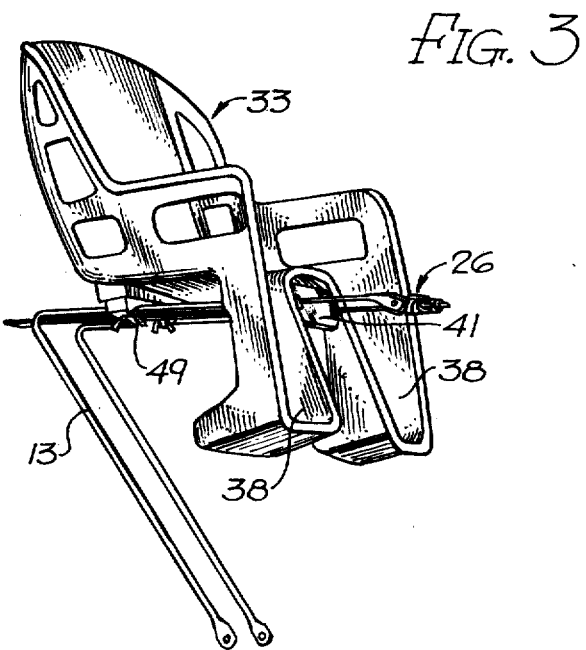
FIG. 3

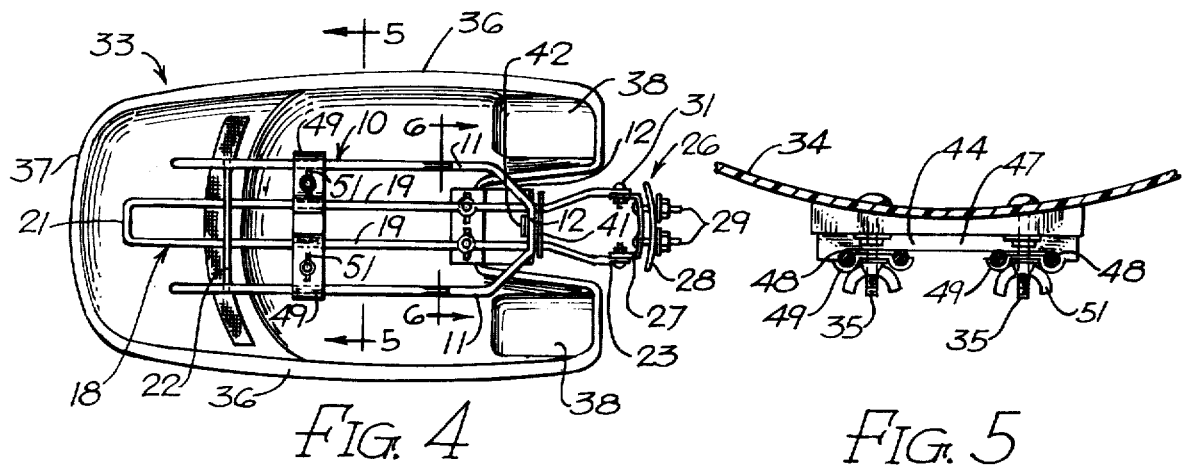
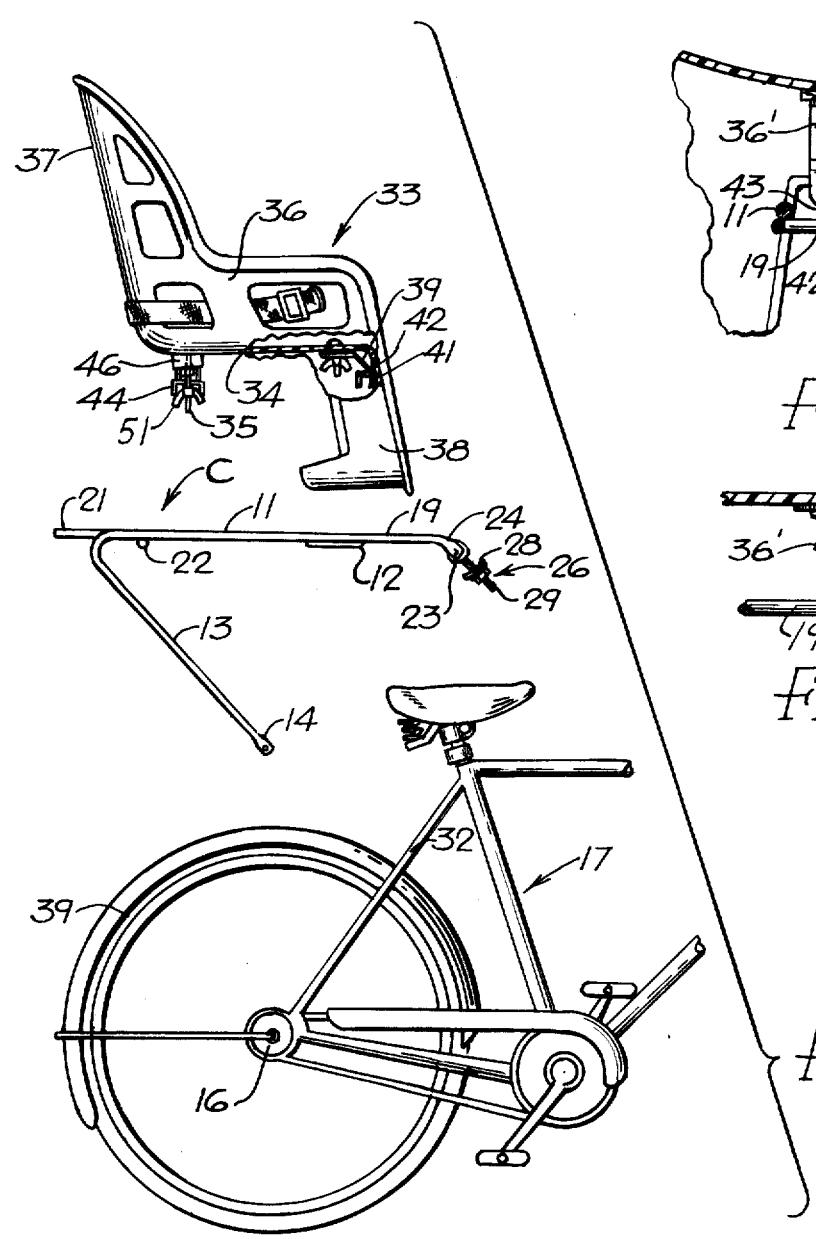
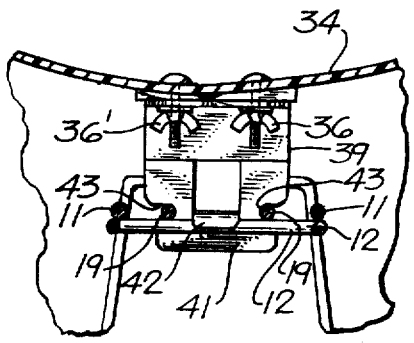
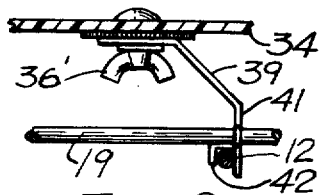
FIG. 4   FIG. 5   FIG. 6   FIG. 7   FIG. 8

COMBINATION REAR LUGGAGE CARRIER AND CHILD SEAT FOR BICYCLE

BACKGROUND OF THE INVENTION

The present invention is related to a combined luggage carrier and child seat which may be readily mounted on a conventional bicycle above the rear wheel, with the seat being supported on the carrier and being detachably secured thereto for ready removal so that the device may be selectively used as a child's seat or as a luggage carrier when the seat is removed.

BRIEF DESCRIPTION OF THE DRAWINGS

FIG. 1 is a side elevational view showing my invention applied to a bicycle.

FIG. 2 is a side elevational view, on an enlarged scale, of a structural detail.

FIG. 3 is a perspective view showing the luggage carrier and seat of my invention in assembled relation.

FIG. 4 is a bottom plan view of the seat and luggage carrier in assembled relation.

FIG. 5 is a cross-sectional view, on an enlarged scale, taken substantially on line 5—5 of FIG. 4.

FIG. 6 is a cross-sectional view, on an enlarged scale, taken substantially on line 6—6 of FIG. 4.

FIG. 7 is an exploded side elevational view of the seat, luggage carrier and bicycle.

FIG. 8 is an elevational view, on an enlarged scale and partly in in cross-section of a detail.

BRIEF DESCRIPTION OF A PREFERRED EMBODIMENT

The device of my invention includes a luggage carrier C formed preferably of suitable bar stock or tubular material and including an elongated generally U-shaped structure 10 having parallel horizontal members 11, 11 integral with a bight portion 12 which is offset from the plane of the members 11. Each of the members 11 has an integral depending leg 13 which is bent at an acute angle and is vertically co-planar with a respective member 11. Each of the legs 13 terminates in a flattened end 14 which is pierced to afford attachment to the rear bearing fork 16 of a bicycle 17. The carrier C also includes a second elongated generally U-shaped structure 18 having a width substantially less than the U-shaped structure 10, first described. The structure 18 includes parallel members 19 connected by a bight portion 21 extending rearwardly beyond the members 11 and disposed opposite the bight portion 12. A tie bar 22 extends transversely of both U-shaped structures 10 and 18 and is welded to the legs thereof. The members 19 extend forwardly beyond the offset bight portion 12 and diverge outwardly terminating in flattened ends 23 which are pierced. As shown clearly in FIG. 2, the terminal portions 24 of the members 19 are downwardly inclined. The members 19 are welded to the offset bight portion 12 which passes under the members thereby allowing all of the members 11 and 19 to lie in the same plane and afford a generally planar support for luggage or other items to be carried. It will be noted that the center portion of the offset bight portion 12 is straight and is disposed normal to the members 11 and 19.

A clamp assembly 26 comprising a U-shaped element 27 and a cooperating bar 28 having registering apertures through which are passed a pair of bolts 29 is secured as with bolts 31 to the flattened ends 23 of the members 19. As seen clearly in FIGS. 1 and 2, the clamp assembly 26 is intended to engage opposite sides of the downwardly extending rear braces 32 of a bicycle frame 17. Thus, with the legs 13 secured to the bearing forks 16 there is provided a rigid triangular support structure for carrying substantial weight.

A child carrier 33 preferably formed of molded plastic material and shaped substantially as shown, includes a seat 34, side arms 36, a back 37 and depending leg receiving portions 38 which are spaced to straddle the rear wheel 39 of the bicycle. As shown, the leg receiving portions 38 are of the wrap-around type to substantially enclose the feet of the child being carried so as to prevent injury to the child.

Bolted to the underside of the forward portion of the seat 34 and secured as with wing nuts 36 is a sheet metal angle bracket 39 having a forward leg 41 disposed substantially in a vertical plane. The leg 41 includes an L-shaped struck-out lug which forms a retaining socket 42 for accommodating the center bight portion 12 and includes opposed notches 43 which serve to accommodate the parallel members 19. The lower portion of the leg 41 has a reduced width as shown in FIG. 6.

Secured to the underside of the seat 34 at the rear thereof, as with bolts 35 is a channel member 44 which extends transversely of the seat. The channel member 44 abuts against a spacer 46 formed of wood or any other suitable material. The intermediate portion of each longitudinal side wall 47 of the channel member 44 is recessed leaving a shoulder 48 at each end. As seen in FIG. 5, the width of each recess is sufficient to accommodate all four members 11 and 19 with the outer members 11 engaging respective side shoulders 48. The channel member 44 constitutes one element of a clamp which includes a pair of sheet metal elements 49 having arcuately formed ends which engage the members 11 and 19. Wing nuts 51 are provided for effecting a clamping action.

As was hereinabove noted, the luggage carrier C is attached to the bicycle 17 on a more or less permanent basis by securing the clamping assembly 26 to the rear frame brace 32 and the lower ends of the depending legs 13 to the bearing forks 16 supporting the rear wheel. The carrier C provides a flat supporting surface for luggage and other items.

In order to attach the child carrier 33 to the carrier C, the carrier 33 is held in an upright position, substantially as viewed in FIG. 7, and the forward leg 41 of the bracket 39 is passed downwardly through the space between the diverging ends of the members 19 to a point where said members are aligned with the notches 43. The carrier 33 then is tilted forwardly and in such position is moved rearwardly to engage the forward bight portion 12 in the socket 42 of the bracket 41. Thereafter, the carrier 33 is rocked rearwardly so that the channel member 44 rests on the members 11 and 19, as viewed in FIG. 5. It will be understood that the wing nuts 51 first are loosened and the clamp elements 49 rotated 90° from the position shown in FIG. 4 so that they may pass between respective members 11 and 19 and then, with the carrier 33 in position, are rotated back to the position shown in FIGS. 4 and 5 to engage the members 11 and 19 in clamping relation. Final securement is effected by tightening the wing nuts 51.

It will be seen that the child carrier 33, at its forward portion, is removably securely held by reason of the members 19 being received in the notches 43 of the bracket 41 and the bight portion 12 of the carrier 10 being received in the socket 42 provided in the bracket.

This arrangement precludes longitudinal movement of the child carrier 33 relative to the carrier C as well as inadvertent separation of the carrier 33 from the carrier C. The clamping elements 44 and 49 at the rear of the carrier 33 effect tight engagement with the members 11 and 19 of the carrier C to provide safe securement.

In order to effect separation of the carrier 33 from the carrier C, the clamping elements 49 are released by rotating the wing nuts 51 to permit rotation of the clamping elements 49 so that they may pass between adjacent legs 11 and 19. Finally, the carrier 33 is rocked upwardly and then slid forwardly to disengage the socket 42 from the bight portion 12.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. An attachment for bicycles and the like comprising a luggage carrier formed of rod-like members and having means for mounting on the rear frame of a bicycle, and a child carrier removably secured on said luggage carrier, said luggage carrier including a first U-shaped member having parallel longitudinal legs connected by a first bight portion, a second U-shaped member having parallel longitudinal legs connected by a second bight portion, said bight portions being oppositely arranged, a tie bar connected to each of said legs intermediate said bight portions, the legs of said first U-shaped member being connected to the bight portion of the second U-shaped member and having forward diverging extensions and carrying clamping means for securement to a rear frame member of said bicycle, the legs of said second U-shaped member having depending extensions embracing a rear cycle wheel and having perforated extremities for attachment to another portion of said rear frame member in close proximity to the axle of the rear cycle wheel, said child carrier being formed of molded plastic and having a seat portion, a back, side walls, and depending leg receiving portions straddling the rear cycle wheel, a sheet metal bracket secured to the underside of said seat portion, said bracket including a vertical leg disposed between the depending leg receiving portions of the child carrier, said vertical leg having a struck-out lug constituting a downwardly opening socket engageable with said second bight portion, said vertical leg having a lateral notch at each side edge with the parallel legs of said first U-shaped member being engageable in said notches and removably secured therein, and locking elements carried on the underside of said seat portion for clamping engagement with the legs of said U-shaped members.

* * * * *